United States Patent
Milchtein Peltsverger et al.

(10) Patent No.: US 11,609,384 B2
(45) Date of Patent: Mar. 21, 2023

(54) LIGHT BLOCKING SHUTTER FOR OPTICAL FIBER ADAPTER

(71) Applicant: Molex, LLC, Lisle, IL (US)

(72) Inventors: Danil Milchtein Peltsverger, Chicago, IL (US); Wenzong Chen, Naperville, IL (US); Jesus Enrique Fung, Des Plaines, IL (US)

(73) Assignee: Molex, LLC, Lisle, IL (US)

( * ) Notice: Subject to any disclaimer, the term of this patent is extended or adjusted under 35 U.S.C. 154(b) by 234 days.

(21) Appl. No.: 16/643,850

(22) PCT Filed: Sep. 18, 2018

(86) PCT No.: PCT/US2018/051502
§ 371 (c)(1),
(2) Date: Mar. 3, 2020

(87) PCT Pub. No.: WO2019/060293
PCT Pub. Date: Mar. 28, 2019

(65) Prior Publication Data
US 2020/0257056 A1    Aug. 13, 2020

Related U.S. Application Data

(60) Provisional application No. 62/560,715, filed on Sep. 20, 2017.

(51) Int. Cl.
*G02B 6/38* (2006.01)

(52) U.S. Cl.
CPC ......... *G02B 6/3825* (2013.01); *G02B 6/3851* (2013.01); *G02B 6/3885* (2013.01); *G02B 6/3893* (2013.01)

(58) Field of Classification Search
CPC .. G02B 6/3825; G02B 6/3851; G02B 6/3885; G02B 6/3893
(Continued)

(56) References Cited

U.S. PATENT DOCUMENTS 5,887,098 A * 3/1999 Ernst ................... G02B 6/3825
385/60
6,004,043 A * 12/1999 Abendschein ....... G02B 6/3825
385/76
(Continued)

FOREIGN PATENT DOCUMENTS

CN    103018842 A    4/2013
CN    103048740 A    4/2013
(Continued)

OTHER PUBLICATIONS

International Search report and written opinion received for PCT application No. PCT/US2018/051502, dated Jan. 28, 2019, 8 pages.
(Continued)

*Primary Examiner* — Kaveh C Kianni

(57) ABSTRACT

A fiber optic adapter is configured to mate with a fiber optic connector. The fiber optic connector has a connector body and a fiber containing ferrule protruding a distance from a forward end of the connector body. The fiber optical adapter includes a housing forming a passageway, a coupling sleeve forming a passageway, and a shutter mounted to the coupling sleeve. The coupling sleeve is configured to accept the connector therein during an insertion of the connector in a longitudinal direction into the passageway. The shutter includes abase portion connected to the coupling sleeve and a light blocking portion extending from the base and extending into the passageway in a first position, the light blocking portion having at least a section being curved from a first end thereof to a second end thereof along a length of the section.

14 Claims, 18 Drawing Sheets

(58) Field of Classification Search
USPC .......................................................... 385/53
See application file for complete search history.

(56) References Cited

U.S. PATENT DOCUMENTS

| | | | | |
|---|---|---|---|---|
| 6,206,577 | B1* | 3/2001 | Hall, III | G02B 6/3825 439/138 |
| 6,352,375 | B1* | 3/2002 | Shimoji | G02B 6/4296 385/139 |
| 6,688,780 | B2 | 2/2004 | Duran | |
| 6,793,399 | B1* | 9/2004 | Nguyen | G01M 11/088 385/119 |
| 7,500,791 | B2* | 3/2009 | Frith | G02B 6/4298 385/88 |
| 8,821,031 | B2* | 9/2014 | Lin | G02B 6/3849 385/59 |
| 9,195,013 | B2* | 11/2015 | Yoshizaki | G02B 6/3869 |
| 9,671,568 | B2* | 6/2017 | Yoshizaki | G02B 6/3849 |
| 10,502,904 | B2* | 12/2019 | Yang | G02B 6/3825 |
| 2003/0147597 | A1* | 8/2003 | Duran | G02B 6/3825 385/76 |
| 2003/0180005 | A1* | 9/2003 | McBride | G02B 6/3825 385/73 |
| 2004/0062486 | A1* | 4/2004 | Tanaka | G02B 6/3825 385/55 |
| 2004/0223701 | A1 | 11/2004 | Tanaka et al. | |
| 2005/0111796 | A1 | 5/2005 | Matasek et al. | |
| 2005/0196106 | A1* | 9/2005 | Taira | G02B 6/3849 385/139 |
| 2005/0201690 | A1* | 9/2005 | Taira | G02B 6/3849 385/53 |
| 2005/0286833 | A1* | 12/2005 | Kramer | G02B 6/3825 385/53 |
| 2006/0153503 | A1* | 7/2006 | Suzuki | G02B 6/3807 385/53 |
| 2006/0153504 | A1* | 7/2006 | Suzuki | G02B 6/3807 385/55 |
| 2006/0204200 | A1* | 9/2006 | Lampert | G02B 6/3849 385/139 |
| 2006/0269206 | A1* | 11/2006 | Zimmel | G02B 6/3825 385/134 |
| 2007/0019913 | A1* | 1/2007 | Iwai | G02B 6/3849 385/56 |
| 2007/0098330 | A1 | 5/2007 | Ozawa et al. | |
| 2008/0056647 | A1* | 3/2008 | Margolin | G02B 6/4201 385/88 |
| 2008/0317428 | A1* | 12/2008 | Nakagawa | G02B 6/4296 385/139 |
| 2009/0226141 | A1* | 9/2009 | Lin | G02B 6/3849 385/134 |
| 2009/0297159 | A1* | 12/2009 | Margolin | G02B 6/4251 385/88 |
| 2010/0284655 | A1* | 11/2010 | Nakano | G02B 6/3825 385/78 |
| 2011/0206325 | A1* | 8/2011 | Hioki | G02B 6/3849 385/76 |
| 2012/0033918 | A1* | 2/2012 | Jibiki | G02B 6/3849 385/75 |
| 2012/0195555 | A1* | 8/2012 | Jibiki | G02B 6/3825 385/75 |
| 2013/0064517 | A1 | 3/2013 | Lin et al. | |
| 2013/0071068 | A1 | 3/2013 | Lin | |
| 2013/0084041 | A1 | 4/2013 | Lin et al. | |
| 2015/0285999 | A1* | 10/2015 | Mamiya | G02B 6/3893 385/56 |

FOREIGN PATENT DOCUMENTS

| | | | | |
|---|---|---|---|---|
| CN | 104635302 | A | | 5/2015 |
| CN | 104656199 | A | | 5/2015 |
| CN | 105593733 | B | * 9/2017 | ........... G02B 6/3818 |
| JP | 2000347075 | A | | 12/2000 |
| JP | 2008-020567 | A | | 1/2008 |
| JP | 2012037542 | A | | 2/2012 |
| WO | 2016203806 | A1 | | 12/2016 |
| WO | 2019/060293 | A1 | | 3/2019 |

OTHER PUBLICATIONS

Office Action received for JP Application No. 2020-514286, dated Mar. 30, 2021, 10 Pages. (5 Pages of English Translation and 5 Pages of Official notification).

Office Action received for CN Application No. 201880060743.4, dated Sep. 18, 2021, 22 Pages (12 Pages of English Translation and 10 Pages of Official notification).

Office action received for JP Application No. 2020-514286, dated Dec. 7, 2021, 15 pages (8 pages of English translation and 7 pages of Official copy).

Office Action received for JP Application No. 2020-514286, dated Jun. 7, 2022, 13 Pages (7 Pages of English Translation and 6 Pages of Official notification).

* cited by examiner

LIGHT BLOCKING SHUTTER FOR OPTICAL FIBER ADAPTER

RELATED APPLICATION

This application claims priority to International Application No. PCT/US2018/051502, filed on Sep. 18, 2018, which is incorporated herein by reference in its entirety which further claims priority to U.S. Provisional Application Ser. No. 62/560,715 filed on Sep. 20, 2017.

TECHNICAL FIELD

This disclosure relates generally to optical interconnections and, more particularly, to a fiber optic adapter configured to mate with a fiber optic connector.

BACKGROUND

U.S. Pat. No. 6,688,780 discloses a cantilevered shutter for an optical adapter. The shutter repeatedly pivots around a fulcrum to open and close the shutter. The repeated pivoting around this fulcrum subjects the shutter to wear and possible breakage. A shutter is provided by the present disclosure which overcomes this problem in the prior art.

SUMMARY

In one aspect, a fiber optic adapter is configured to mate with a fiber optic connector. The fiber optic connector has a connector body and a fiber containing ferrule protruding a distance from a forward end of the connector body. The fiber optical adapter includes a housing forming a passageway, a coupling sleeve forming a passageway, and a shutter mounted to the coupling sleeve. The coupling sleeve is configured to accept the connector therein during an insertion of the connector in a longitudinal direction into the passageway. The shutter includes a base portion connected to the coupling sleeve and a light blocking portion extending from the base and extending into the passageway in a first position, the light blocking portion having at least a section being curved from a first end thereof to a second end thereof along a length of the section.

DETAILED DESCRIPTION

Figure 1:
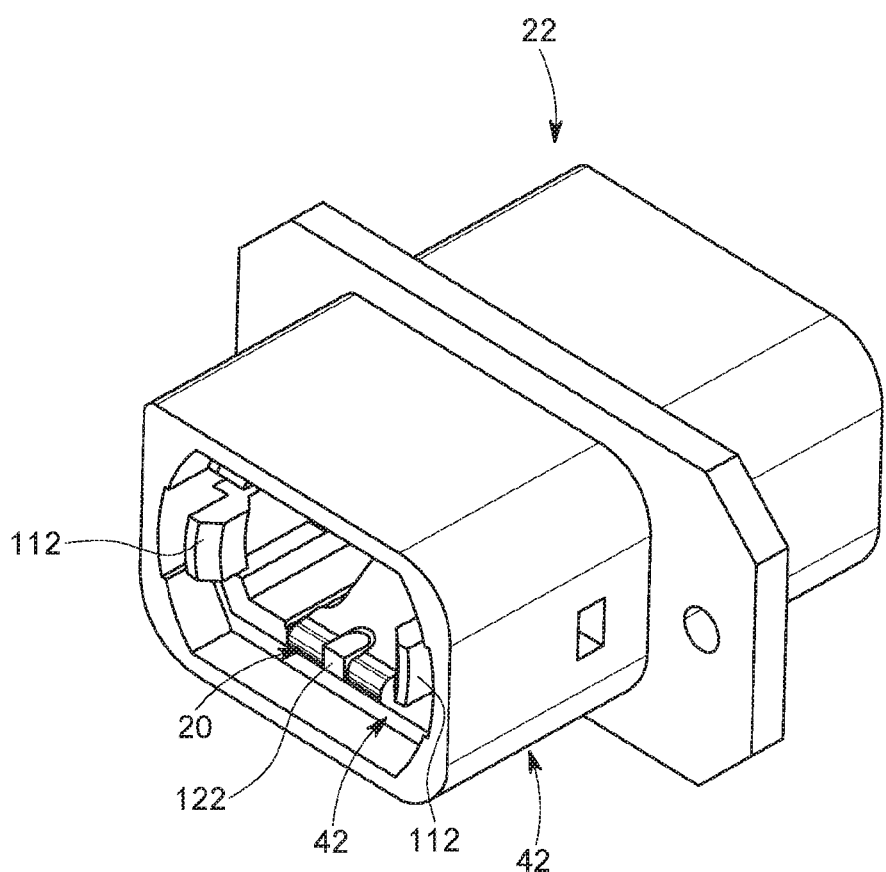
FIGS. 1-3 illustrates an adapter.
Figure 2:
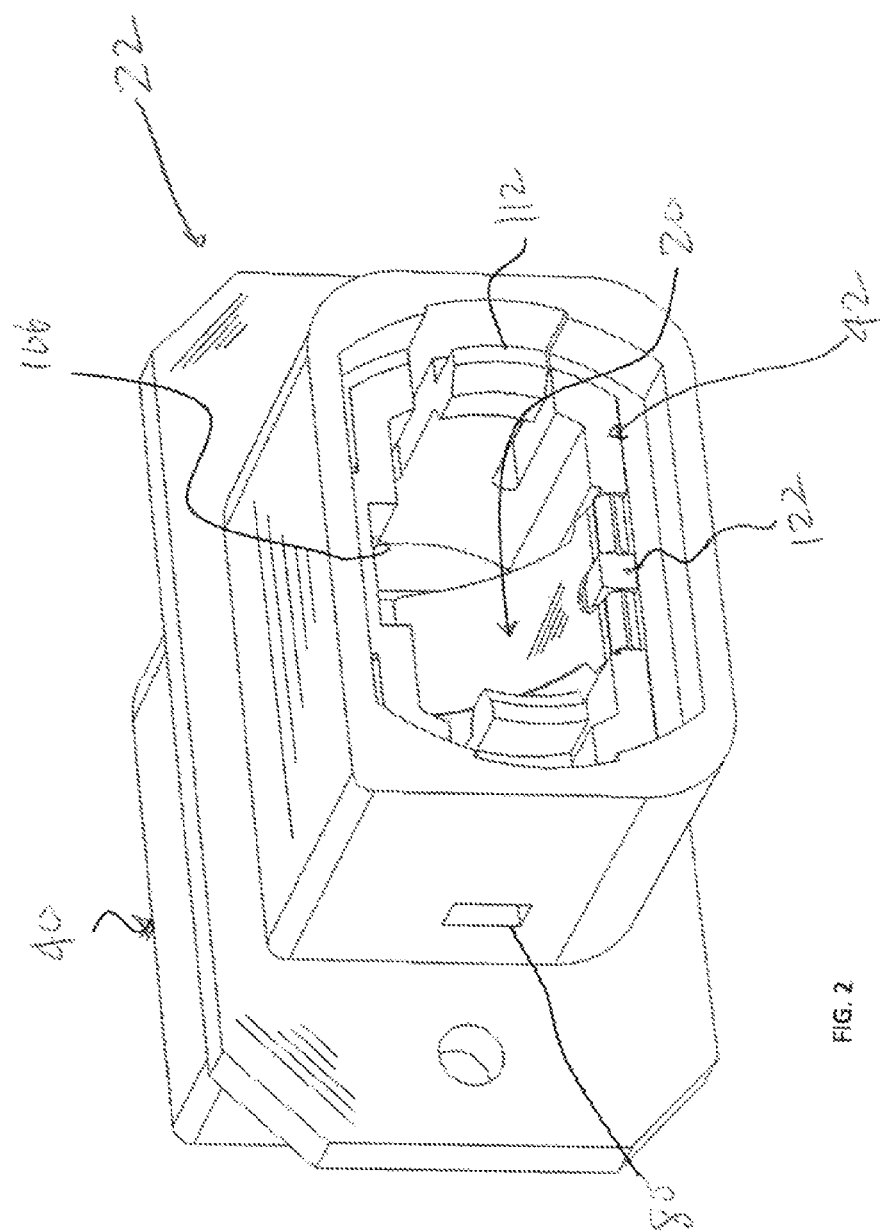
Figure 3:
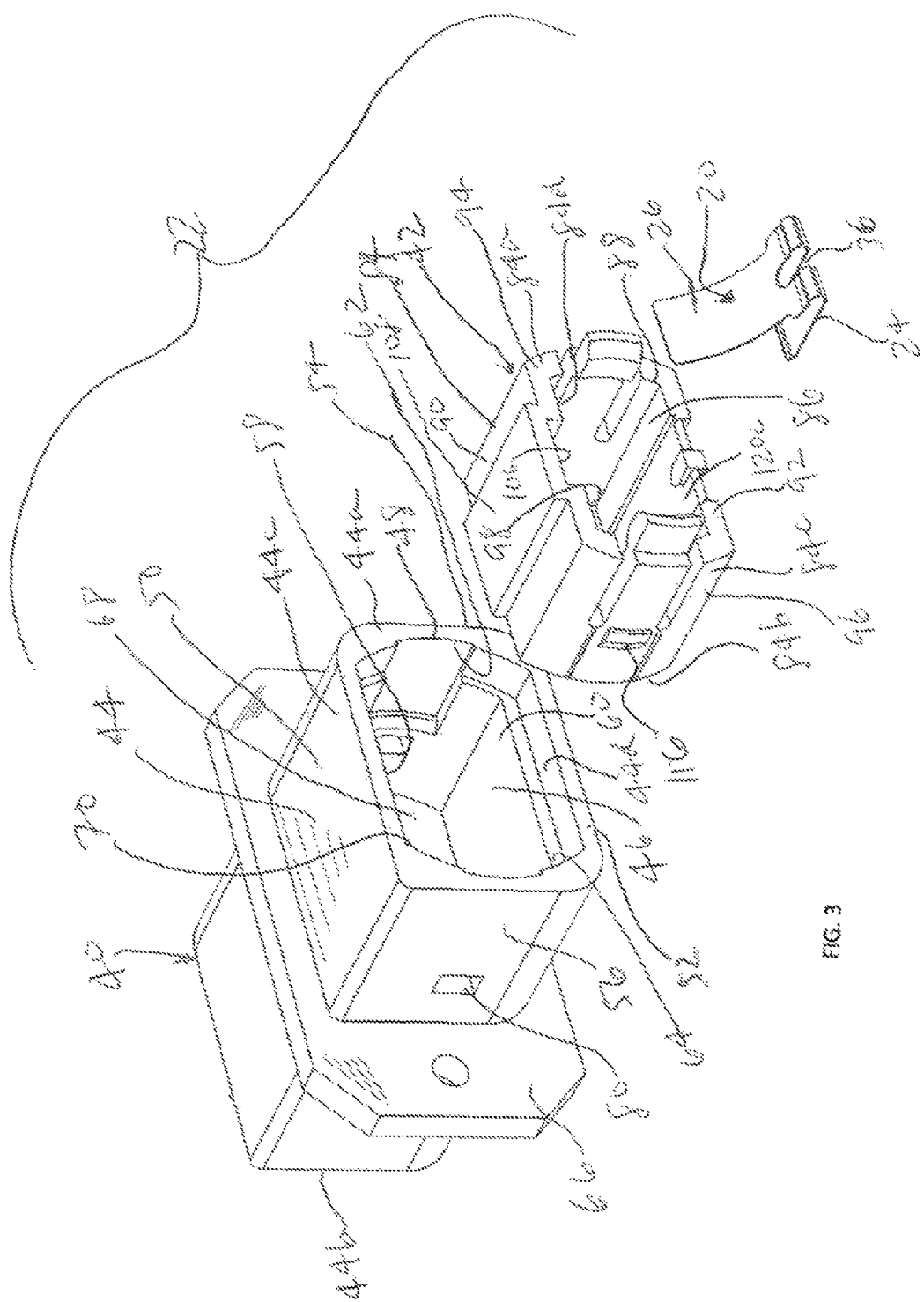

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

While directional terms such as "top" and "bottom" are used herein, this is only used for convenience in explanation and do not denote a required direction of orientation.

A shutter 20 is formed as part of a fiber optic adapter 22 to prevent light emissions from the fiber optics of a connector 220 when the adapter 22 is in an open position. The adapter 22 is in the open position when a mating connector is not inserted into the other end of the adapter 22. This prevents eye damage if a person should look into the open end of the connector 220 that is carrying an optical signal.

Figure 4:
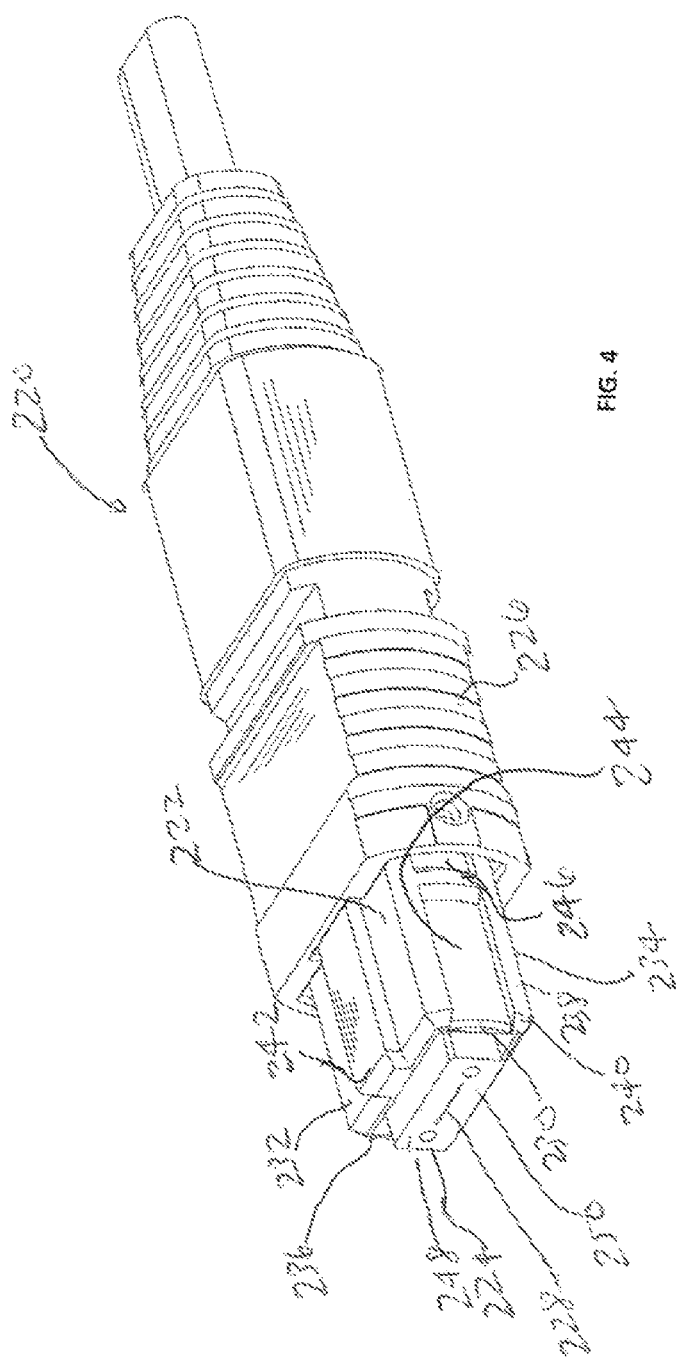
FIG. 4 illustrates a connector.

FIG. 4 illustrates such a connector 220. The connector 220 includes a connector body 222 which holds a ferrule 224, and an outer body 226 which slides longitudinally over the connector body 222. The ferrule 224 holds one or more optical fibers 228.

The connector body 222 is formed from a wall 228 having an outer surface and a terminal front face 230. A passageway is provided through the connector body 222 in which the ferrule 224 is seated. As illustrated, the wall 228 has a top surface 232, a bottom surface 234 and side surfaces 236, 238 extending between the top and bottom surfaces 232, 234. Corners 240 formed between the surfaces 232, 234, 236, 238 and the terminal front face 230 may be angled to promote entry of the connector 220 into the adapter 22. A key 242 extends outwardly from the wall 228 and is configured to mate with the adapter 22. In an embodiment, the key 242 extends from the top surface 232 and extends from a front end of the connector body 222 to a rear end of the connector body 222. Each side surface 232, 234 has a recess 244 extending from the terminal front face 230 rearwardly, and a further recess 246 spaced rearwardly of the recess 244.

The ferrule 224 protrudes outwardly from the terminal front face 230 of the connector body 222. The ferrule 224 is formed from a wall 248 having an outer surface and a terminal front face 250 having at least one passageway therethrough in which the optical fibers 228 are seated. The optical fibers 228 are terminated at the terminal front face 250 in a known manner. The terminal front face 250 of the ferrule 224 protrudes a distance from the terminal front face 230 of the connector body 222 in a longitudinal direction, and protrudes a distance from the bottom surface 234 of the connector body 222.

Figure 5:
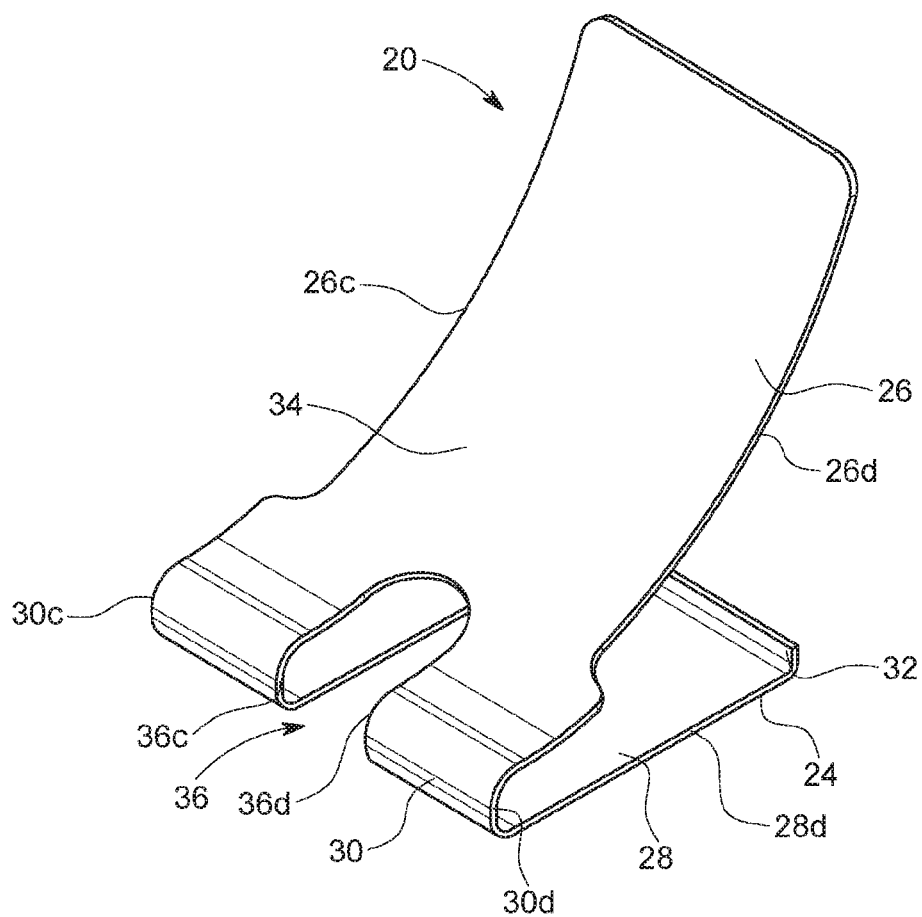
FIGS. 5-6 illustrates a shutter.
Figure 6:
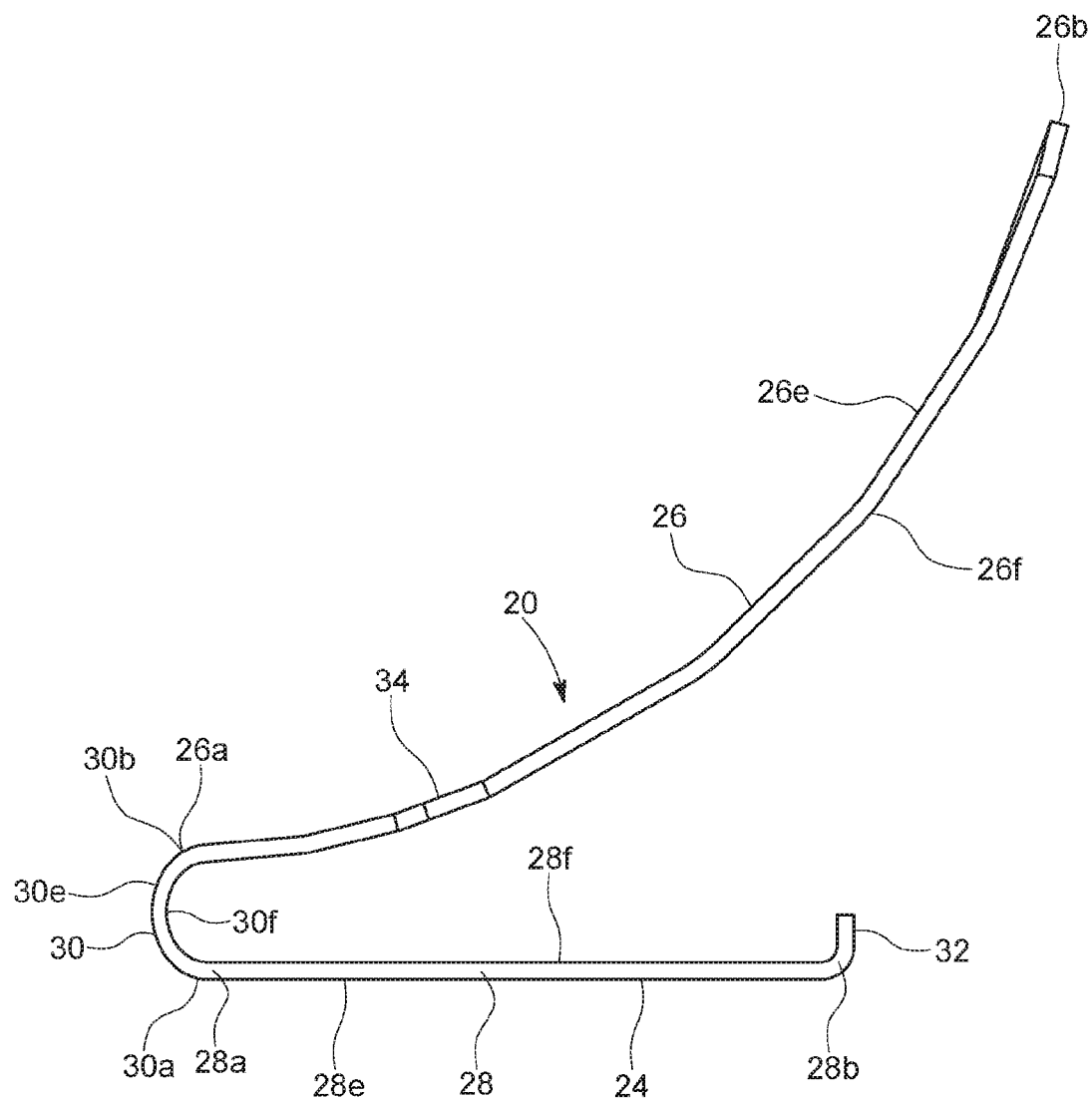
Figure 14:
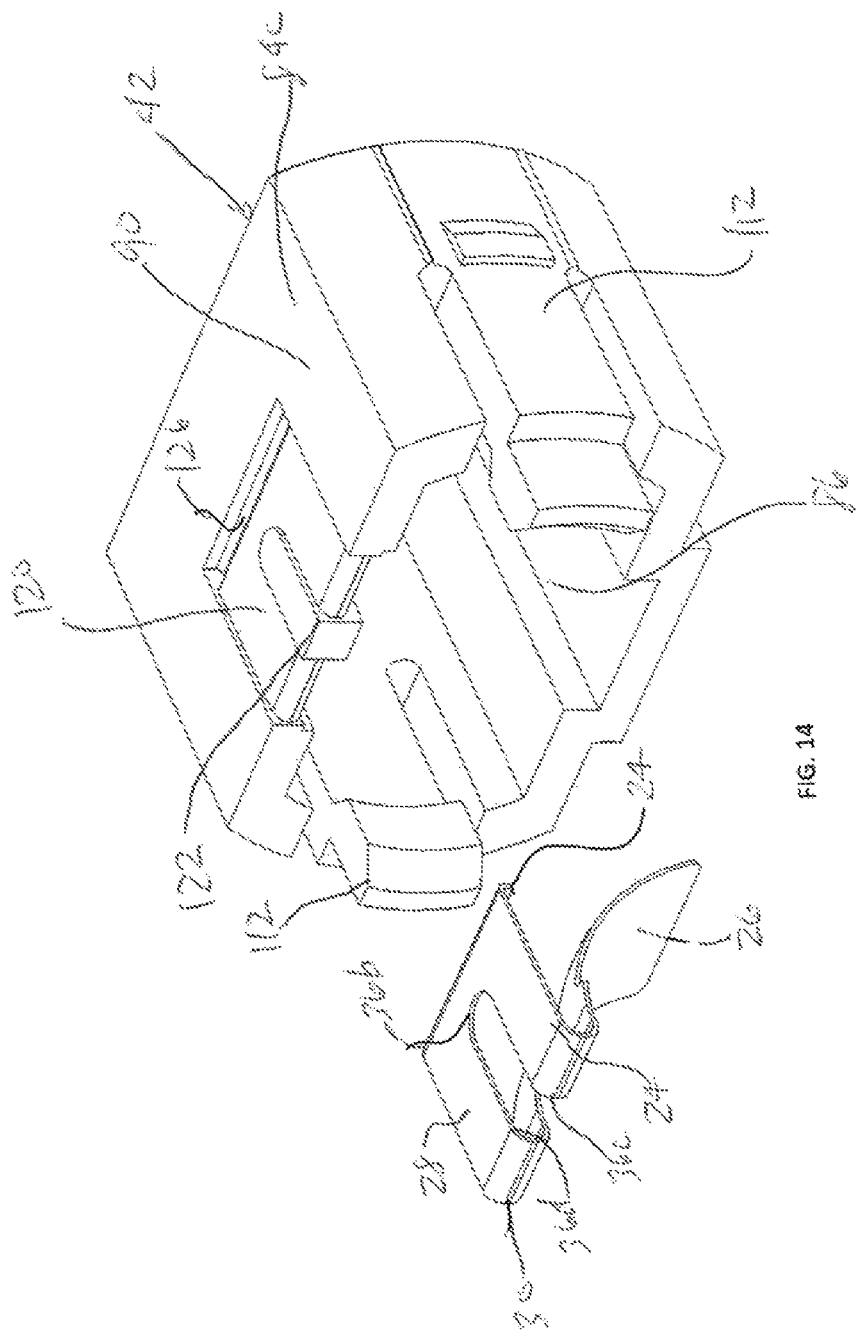
FIGS. 14-16 illustrate a shutter and coupling sleeve.
Figure 15:
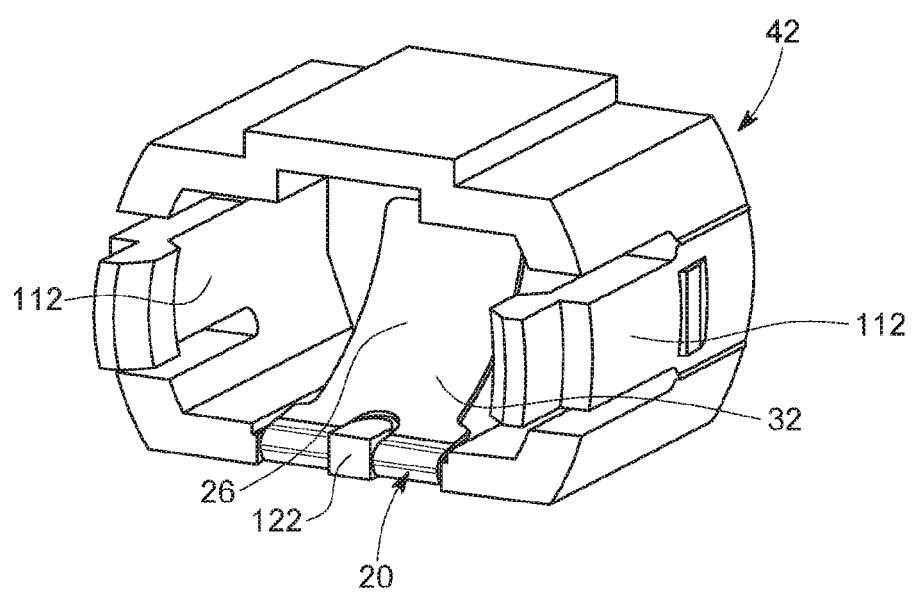
Figure 16:
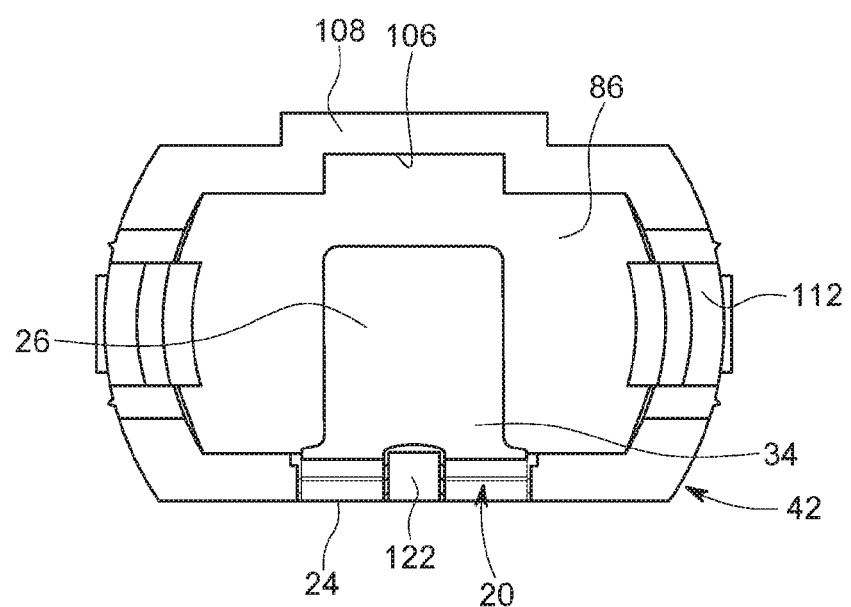

As best shown in FIGS. 5, 6 and 14, the shutter 20 is formed from a base portion 24 and a flexible light blocking portion 26 which is cantilevered from the base portion 24. In an embodiment, the shutter 20 is formed form a continuous piece of material which is flexible. The shutter 20 is made of a material that is about 0% transmissive (i.e., about 100% opaque), although a material that allows some light emissions to be visible through the shutter 20 is also contemplated without deviating from the spirit and scope of the present disclosure. The material selected should have some shape memory characteristics so that the shutter 20 returns to an unflexed position, even after repeated flexing of the light blocking portion 26. In an embodiment, the shutter 20 is formed of stainless steel. The shutter 20 may be formed by die cast, cutting and stamping, chemical etching or other methods commonly used in the art.

The base portion 24 of the shutter 20 has a first planar section 28 having front and rear ends 28a, 28b and side edges 28c, 28d extending between the front and rear ends 28a, 28b, such that a lower surface 28e and an upper surface 28f are defined. A length is defined between the front and rear ends 28a, 28b, and a width is defined between the side edges 28c, 28d. The base portion 24 has an upstanding second section 30 extending upwardly from front end 28h of the first section 28. The second section 30 has lower and upper ends 30a, 30b and side edges 30c, 30d extending between the lower and upper ends 30a, 30b, such that a front surface 30e and a rear surface 30f are defined. A height is defined between the lower and upper ends 30a, 30b, and a width is defined between the side edges 30c, 30d. The lower end 30a of the second section 30 merges smoothly with the front end 28a of the first section 28. In some embodiments, the second section 30 is radiused along its height. In some embodiments, the second section 30 is planar with curved corners merging with the first section 28. In some embodiments, the base portion 24 further has an upturned end section 32 at the rear end 28b of the first section 28.

The light blocking portion 26 of the shutter 20 has front and rear ends 26a, 26b and side edges 26c, 26d extending between the front and rear ends 26a, 26b, such that a front surface 26e and a rear surface 26f are defined. A length is defined between the front and rear ends 26a, 26b, and a width is defined between the side edges 26c, 26d. The front end 26a of the light blocking portion 26 merges smoothly with the upper end 30b of the second section 30 of the base portion 24. At least a section 34 of the light blocking portion 26 which extends upper end 30b of the second section 30 is curved along its length from a front end of the curved section 34 to a rear end of the curved section 34. The curved section 34 extends for a predetermined axial length and a predetermined vertical height. In an embodiment, the curved section 34 curves along its length along a constant radius. In an embodiment, the curved section 34 includes one or more straight portions that are adjoined at an angle. The use of multiple straight portions to force the curved section 34 may aid in ease of manufacturing. In an embodiment, the remainder of the light blocking portion 26 which extends from the curved section 34 is curved along its length, and may be curved along its length at the same radius as the curved section 34. In an embodiment, the remainder of the light blocking portion 26 which extends from the curved section 34 is flat along its length. The rear surface 26f of the light blocking portion 26 faces the upper surface 28f of the base portion 24.

The light blocking portion 26 flexes relative to the base portion 24 as described herein to reduce the distance between the ends 26b, 28b of the light blocking portion 26 and the base portion 24.

An opening 36 is provided through the base portion 24 and the light blocking portion 26 and is formed by an end wall surface 36a in the first section 28 of the base portion 24, an end wall surface 36b in the light block section 26, and side wall surfaces 36c, 36d which extend continuously between the end walls 36a, 36b. In an embodiment, the opening 36 is provided at the midpoint between the side edges 26c/30c/26c, 26d/30d/26d of the shutter 20. While the opening 36 is shown in the first and second sections 28, 30 and in the light blocking portion 26, the opening 36 may be provided in only one or two of the first and second sections 28, 30 and the light blocking portion 26.

The adapter 22 includes a housing 40 into which a coupling sleeve 42 is inserted. The adapter 22 is preferably made of moldable metal, plastic or other suitable materials and is manufactured as a single piece (i.e., die-cast), eliminating the need to assemble individual components. The coupling sleeve 42 carries the shutter 20 and is also configured to mate with the connector 220.

Figure 7:
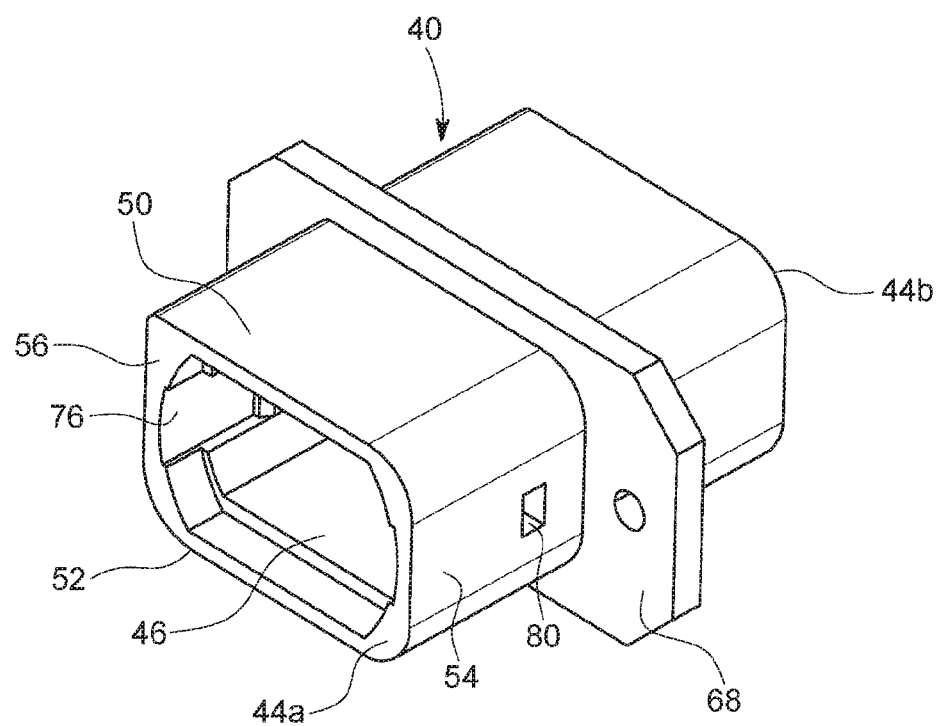
FIGS. 7-9 illustrates a housing.
Figure 8:
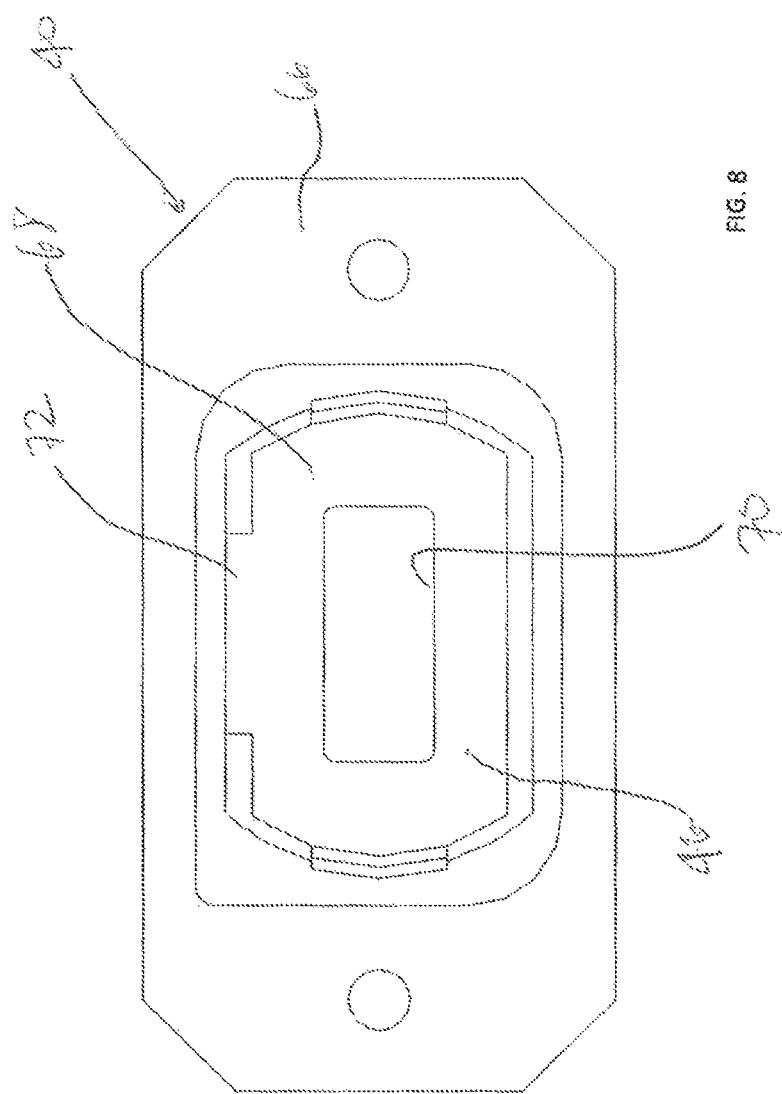
Figure 9:
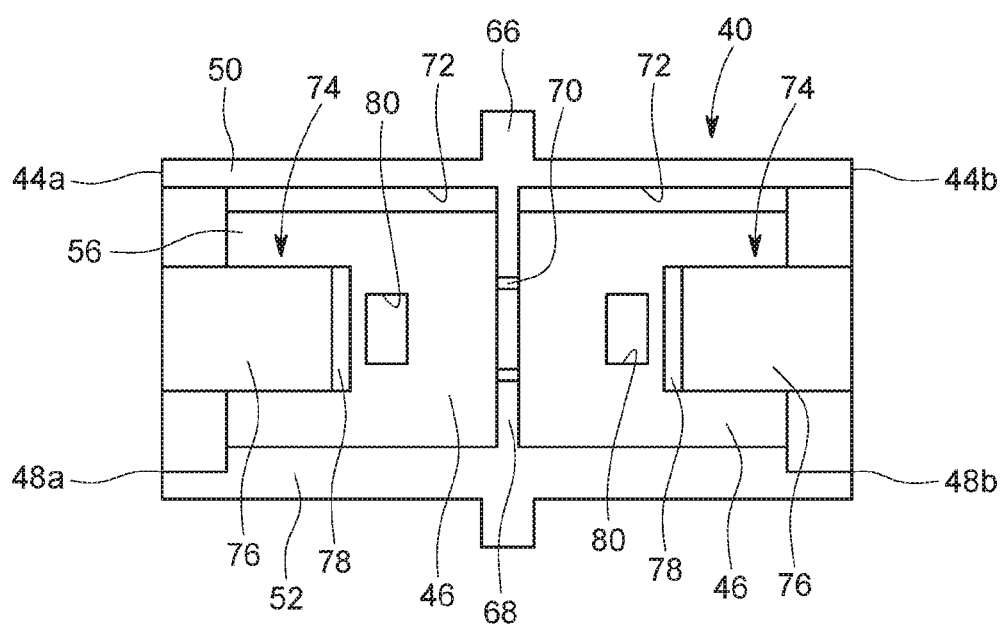
Figure 10:
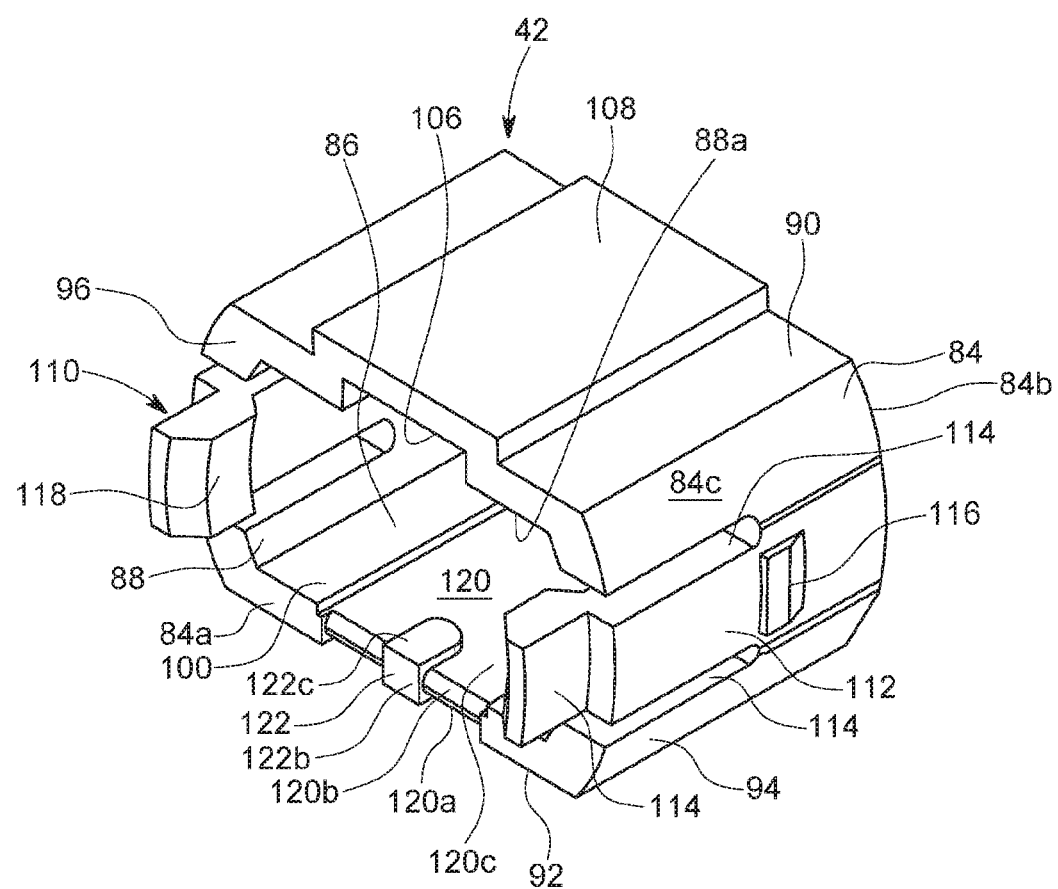
FIGS. 10-13 illustrates a coupling sleeve.
Figure 11:
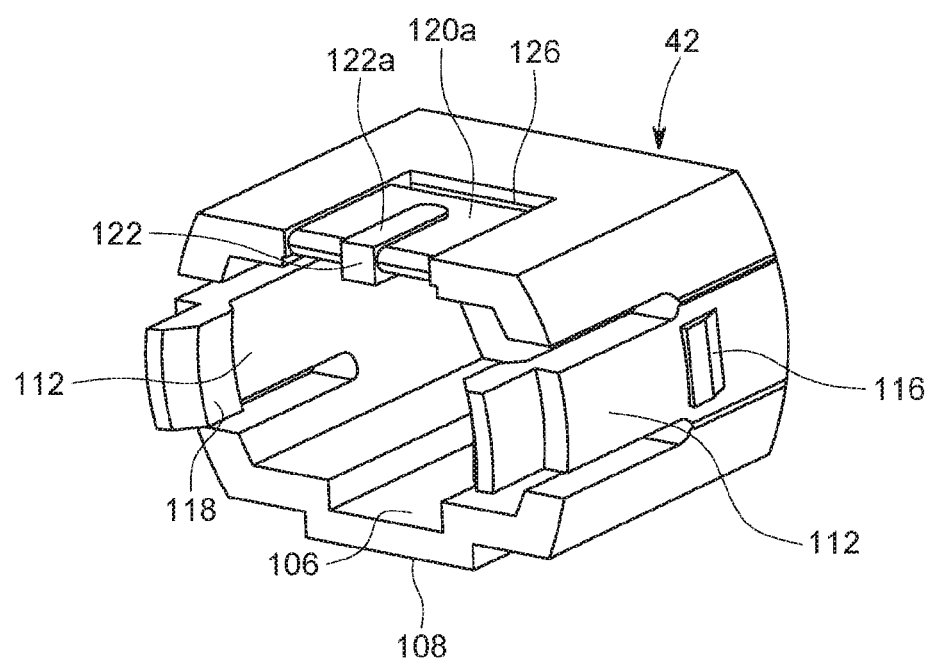
Figure 12:
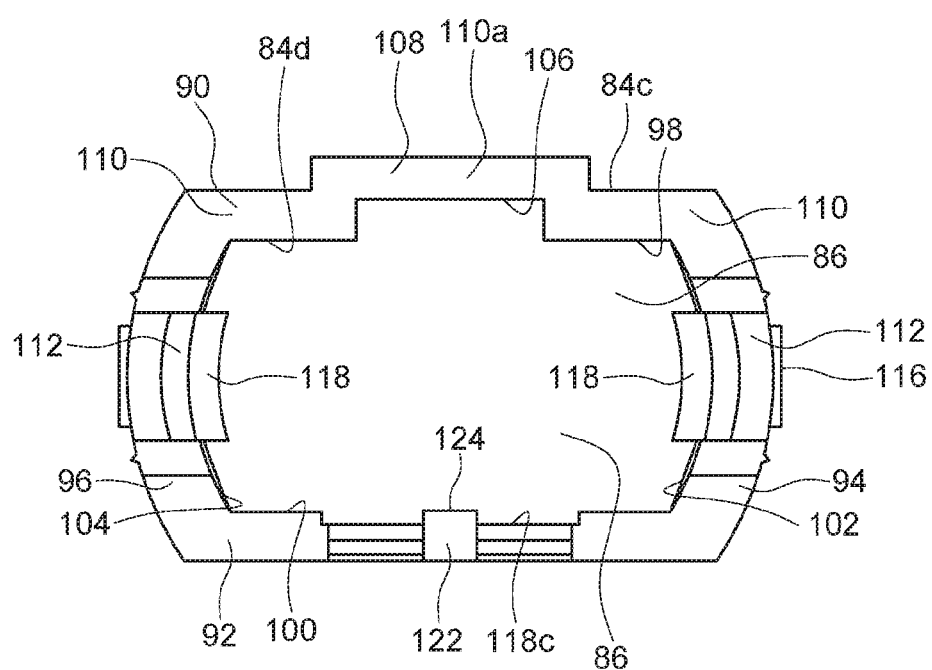
Figure 13:
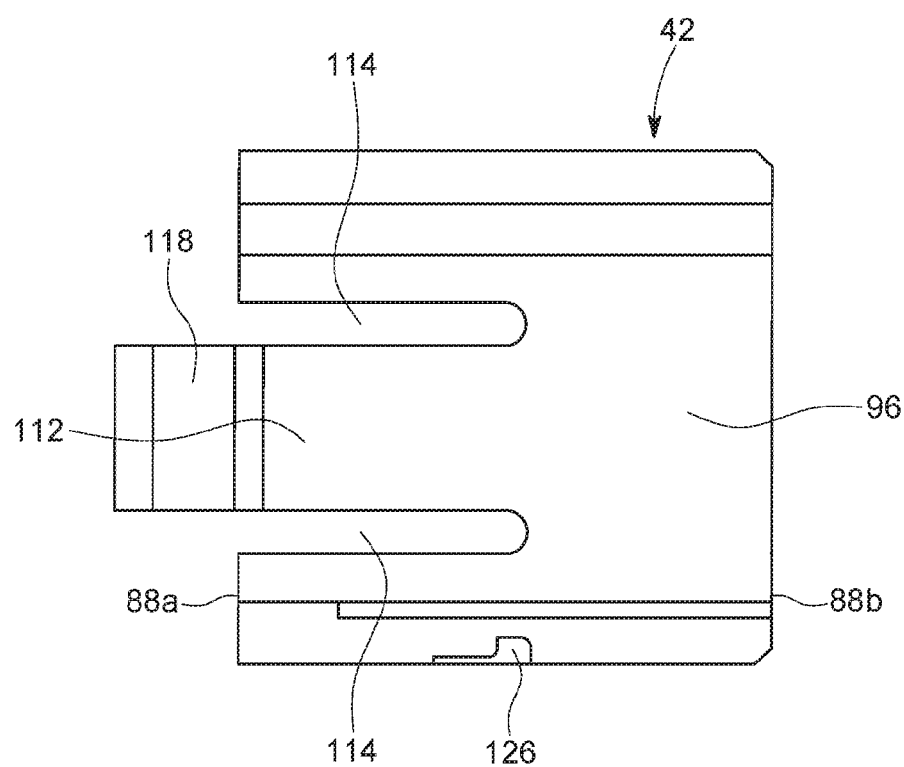

As best shown in FIGS. 7-9, the housing 40 is formed from a wall 44 having opposite ends 44a, 44b which defines an outer surface 44c, and a passageway 46 extending through the wall 44 and which defines an inner surface 44d of the wall 44. Insertion openings 48a, 48b are provided at the ends 44a, 44h of the housing 40. As illustrated, the wall 44 is formed from a top wall portion 50, a bottom wall portion 52 and a pair of side wall portions 54, 56 extending between the top and bottom wall portions 50, 52 such that the passageway 46 has a top surface 58, a bottom surface 60, and side surfaces 62, 64 connecting the top and bottom surfaces 58, 60. A flange 66 extends outwardly from the wall portions 50, 52, 54, 56 and is perpendicular to the passageway 46. The flange 66 may have many different industry-standard and non-standard configurations EMI, standard, reduced profile, etc.), and may be located in various positions on the housing 40. As shown in the drawings, the flange 66 extends from all of the wall portions 50, 52, 54, 56 around the housing 40, but for example, the flange 66 could extend only from the top wall portion 50. The housing 40 may be made of two parts or of a single part.

A dividing wall 68 extends from the inner surface 44d and bisects the passageway 46 to form two insertion passages. The dividing wall 68 is made of a material that attenuates the electromagnetic field generated by the connector 220 so that dividing wall 68 provides electromagnetic interference (EMI) shielding. The dividing wall 68 includes a ferrule window 70 approximately centered on the dividing wall 68 that is large enough to accommodate the approximate width of a typical ferrule 224 so that fiber optic light from the connector 220 can pass unblocked from the front insertion passage to the rear insertion passage.

A keyway 72, which is in communication with the passageway 46, extends along the inner surface 44d from each end 44a, 44b toward the dividing wall 68. In an embodiment, each keyway 72 extends from the respective end 44a, 44b to the dividing wall 68. In an embodiment, each keyway 72 is provided in the top wall 50.

In an embodiment, a latching receiving structure 74 is provided in the housing 40 proximate to each end 44a, 44b. In an embodiment, the latching receiving structure 74 includes a pair of recesses 76 extending along the inner surface 44d from the respective end 44a, 44b inwardly toward the dividing wall 68 to a terminating end wall 78, and a pair of openings 80 provided through the wall 44 which are spaced rearwardly of the terminating end walls 78. The terminating end walls 78 may be formed by a surface which angles outwardly and rearwardly from the end 44a, 44b. The recesses 76 may be aligned with each other. The openings 80 may be aligned with each other. Each opening 80 may be aligned with a respective recess 76. In an embodiment, the recesses 76 and associated openings 80 are provided in the side walls 54, 56.

As best shown in FIGS. 10-13, the coupling sleeve 42 is formed from a wall 84 having opposite ends 84a, 84b which defines an outer surface 84c, and a passageway 86 extending through the wall 84 and which defines an inner surface 84d of the wall 84. Openings 88a, 88b are provided at the ends 84a, 84b of the housing 80. As illustrated, the wall 84 is formed from a top wall portion 90, a bottom wall portion 92 and a pair of side wall portions 94, 96 extending between the top and bottom wall portions 90, 92 such that the passageway 86 has a top surface 98, a bottom surface 100, and side surfaces 102, 104 connecting the top and bottom surfaces 98, 100.

The top wall portion 90 forms a keyway 106 on the inner surface 84d of the top wall portion 90, and a key 108 on the outer surface 84c of the top wall portion 90. The keyway 106 and key 108 may be formed by offsetting a section 90a of the top wall portion 90 from side sections 90b, 90c of the top wall portion 90. Each section 90a, 90b, 90c may have planar inner and outer surfaces. In an embodiment, the keyway 106 and key 108 extend from end 84a to end 84b.

In an embodiment, a latching engaging structure 110 is provided as part of the coupling sleeve 42 and is configured to mate with the latching receiving structure 74 on the housing 40. In an embodiment, the latching engaging structure 110 includes a latch arm 112 integrally formed as part of each side wall 94, 96. In an embodiment, the latch arm 112 is separated from the remainder of the respective side wall 94, 96 by openings 114, such that each latch arm 112 can flex relative to the remainder of the side wall 94, 96 at a joint between the respective latch arm 112 and side wall 94, 96. In an embodiment, a finger gripping portion 114 of each latch arm 112 extends forwardly of the end 84a of the coupling sleeve 42. In an embodiment, each latch arm 112 has a housing latching protrusion 116 extending outwardly therefrom and outwardly from the outer surface 84c. In an embodiment, each housing latching protrusion 116 is spaced from the joint between the latch arm 112 and the remainder of the side wall 94, 96. In an embodiment, each latch arm 112 has a connector latching protrusion 118 extending outwardly therefrom and towards the passageway 86. In an embodiment, the connector latching protrusion 118 is on an interior surface of each finger gripping portion 114.

A recess 120 is provided in the wall 84 into which the shutter 20 is mounted. In an embodiment as shown, the recess 120 is provided in the bottom wall portion 92 at the end 84a. In an embodiment, the recess 120 has a lower section 120a in the outer surface 84c, a front section 120b in the end 84a, and an upper section 120c in the inner surface 84d, and the recess 120 extends continuously. In an embodiment, the upper section 120 extends from the end 84a to end 84b. In an embodiment, the recess 120 extends along the midpoint of the bottom wall portion 92. The lower section 120a defines a width which is greater than, and preferably slightly greater than, the width of the first section 28 of the base portion 24; the front section 120b defines a width which is greater than, and preferably slightly greater than, the width of the second section 30 of the base portion 24; the upper section 120c defines a width which is greater than, and preferably slightly greater than, the width of the light blocking portion 26. In an embodiment, the recess 120 only includes upper section 120c.

A shutter receiving protrusion 122 extends outwardly from the sections 120a, 120b, 120c. In an embodiment, the shutter receiving protrusion 122 has a lower section 122a extending from the lower section 120a, a front section 122b extending from the front section 120b, and an upper section 122c extending from the upper section 122a. In an embodiment, an upper surface 124 of the upper section 122a is flush with the bottom surface 100. While the shutter receiving protrusion 122 is shown as extending from all of the sections 120a, 120b, 120c, the shutter receiving protrusion 122 may be provided in only one or two of the sections 120a, 120b, 120c.

In an embodiment, the recess 120 and the shutter receiving protrusion 122 are provided at a position opposite to the keyway 106.

A cavity 126, see FIG. 14, is provided in the outer surface 84c of the bottom wall portion 90 at a position spaced from the end of the section 120a.

To assemble the adapter 22, the shutter 20 is attached to the coupling sleeve 42 by seating within the recess 120 with the first section 28 of the base portion 24 being seated within the lower section 120a, the second section 30 of the base portion 24 being seated within the front section 120b, the light blocking portion 26 being adjacent to the upper section 120c, and the upturned end section 32 seating within the cavity 126. The shutter receiving protrusion 120 seats within the opening 36 and conforms to the shape of the opening 36 to secure the shutter 20 to the coupling sleeve 42. When the connector 220 is not inserted into the coupling sleeve 42, the curved section 34 curves inwardly into the passageway 86 and is in a first position.

Figure 17:
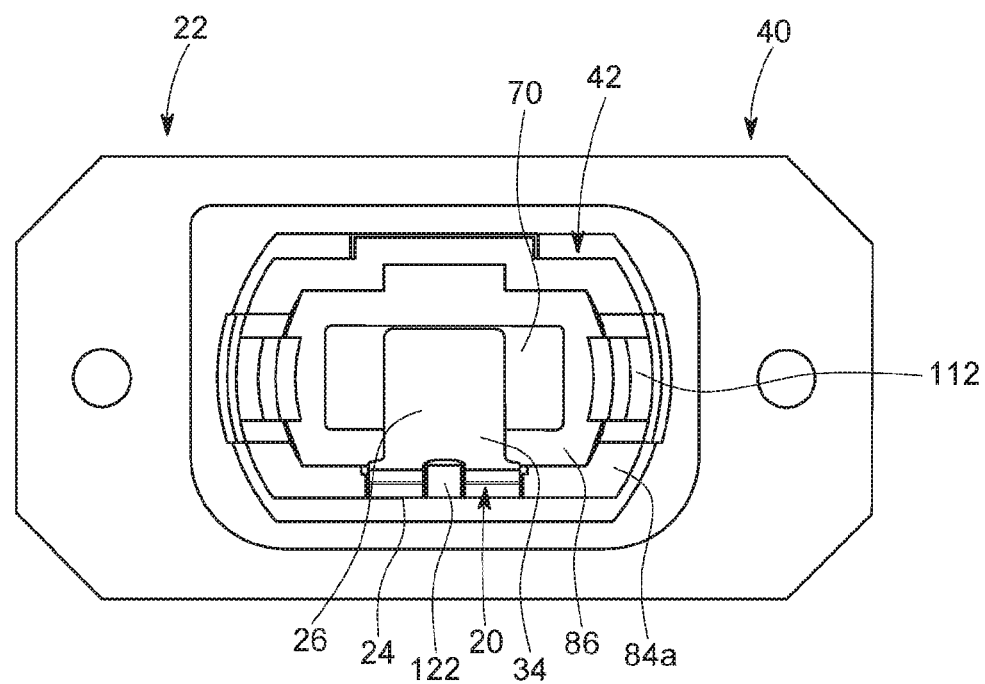
FIG. 17 illustrates an adapter.

Thereafter, the end 84b of the coupling sleeve 42 is inserted through the opening of the housing 40, for example opening 48a, and into the passageway 86 of the housing 40. The end 84b of the coupling sleeve 42 may abut against the dividing wall 68 when fully inserted. During this insertion, the latching engaging structure 110 mates with the latching receiving structure 74, and the key 108 of the coupling sleeve 42 mates with the keyway 72 of the housing 40. Specifically, during this insertion, the housing latching protrusions 116 on the coupling sleeve 42 may engage against and slide along the recesses 76 in the housing 40. When the housing latching protrusions 116 engage the terminating end walls 78, the latch arms 112 flex inwardly as further insertion force is applied to the coupling sleeve 42. The housing latching protrusions 116 pass over the portion of the side walls 54, 56 between the terminating end walls 78 of the recesses 76 and the openings 80. Once the housing latching protrusions 116 align with the openings 80, the latch arms 112 flex outwardly and the housing latching protrusions 116 seat within the openings 80 to releasably secure the coupling sleeve 42 into the housing 40. During this insertion, the key 108 slides along the keyway 72. This mating engagement of the key 108 and keyway 72 ensures that the coupling sleeve 42 can only be inserted into the housing 40 in one orientation. The light blocking portion 26 at least partially aligns with the ferrule window 70 in the longitudinal direction to at least partially block the ferrule window 70, see FIG. 17. Since the ferrule window 70 is partially blocked by the light blocking portion 26, any light from a mating connector (not shown) inserted into the other end of the adapter 22 cannot pass through to the end 84a. In an embodiment, the latch arms 112 do not extend. outwardly from the end 48a of the housing 40 when the coupling sleeve 42 is seated therein.

Figure 18:
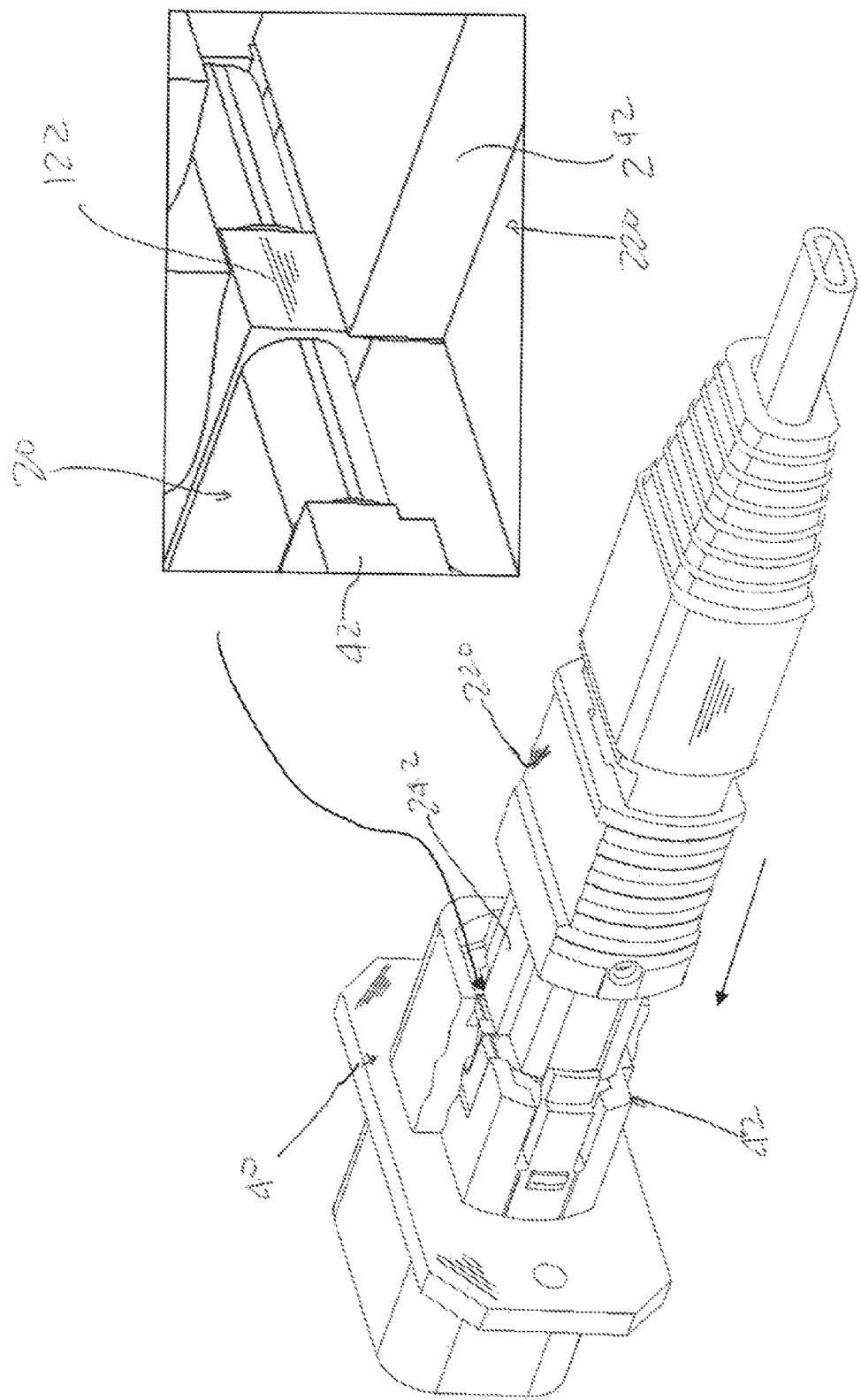
FIG. 18 illustrates a connector and adapter.

To assemble the connector 220 with the adapter 22, the connector 220 is inserted through the end 84a of the coupling sleeve 42 and into the passageway 86 of the coupling sleeve 42. During this insertion of the connector 220 into the adapter 22, the corner 240 of the connector body 222 contacts the curved section 34 of the shutter 20, but the ferrule 224 does not contact the curved section 34 of the shutter 20. As the connector 220 is inserted into the coupling sleeve 42, the curved section 34 of the light blocking portion 26 of the shutter 20 continuously flexes along its length as a result of this contact to flatten the section 34. As such, the section 34 "unrolls" to assume a flattened shape and is in a second position. As a result, the light blocking portion 26 of the shutter 20 does not flex around a single fulcrum as is performed in the prior art. When the connector 220 is fully inserted into the coupling sleeve 42, the light blocking portion 26 of the shutter 20 is generally planar and seats within the upper section 120c of the recess 120. The light blocking portion 26 of the shutter 20 only contacts the connector body 222 during insertion; the light blocking portion 26 of the shutter 20 does not contact the ferrule 224. The connector latching protrusions 118 slide along the recesses 244 in the connector 220 and engage within the recesses 246 to secure the connector 220 to the adapter 22. The key 242 on the connector 220 slides along the keyway 106 of the coupling sleeve 42, thereby preventing the connector 220 from being inserted into the coupling sleeve 42 in an incorrect orientation. If the connector 220 is attempted to be inserted into the adapter 22 in the incorrect orientation, the key 242 on the connector 220 will engage with the protrusion 122 on the coupling sleeve 42, see FIG. 18, thereby preventing entry into the passageway 86 of the coupling sleeve 42.

To disengage the connector 220 from the adapter 22, the latch arms 112 are flexed to unseat the connector latching protrusion 118 from the recesses 246. The connector 220 is then pulled outwardly from the coupling sleeve 42. As the connector 220 is pulled outwardly, the corner 240 of the connector body 222 contacts the light blocking portion 26 of the shutter 20, but the ferrule 224 does not contact the light blocking portion 26 of the shutter 20. As the connector 220 is pulled outwardly from the coupling sleeve 42, the light blocking portion 26 of the shutter 20 flexes and "re-rolls" into the curved shape to resume the first position. When the connector 220 is fully withdrawn from the coupling sleeve 42, the light blocking portion 26 of the shutter 20 automatically resumes its initial curved shape. The light blocking portion 26 of the shutter 20 only contacts the connector body 222 during disengagement; the light blocking portion 26 of the shutter 20 does not contact the ferrule 224.

The assembly of the shutter 20 with the coupling sleeve 42 and the assembly of the connector 220 with the adapter 22 is performed by hand and without the use of tools.

Since the section 34 of the light blocking portion 26 that contacts the connector 220 is curved, a fulcrum is not provided between the section 34 of the light blocking portion 26 and the base portion 24 around which the light blocking portion 26 would repeatedly be actuated as is provided in the prior art. As a result, the shutter 20 is less likely to wear than when a fulcrum is provided as is provided in the prior art.

Since the section 34 of the light blocking portion 26 that contacts the connector 220 is curved along its length, this provides for less frictional engagement between the section 34 of the light blocking portion 26 and the connector 220 than if the light blocking portion 26 was flat along the section 34 where the light blocking portion 26 contacts the connector 220. As a result, stress forces which result from the insertion of the connector 220 into the coupling sleeve 42 are distributed over along the length of the curved section 34 of the light blocking portion 26.

The width of the light blocking portion 26 of the shutter 20 can be varied to accommodate the usage of more or less optical fibers 228 mounted in the ferrule 224.

While the key 108 is described as being on the coupling sleeve 42 and the keyways 72 provided in the housing 40, the housing 40 may have keys 108 and the coupling sleeve 42 has a mating keyway 72. While the key 242 is described as being on the connector 220 and the keyway 106 provided in the coupling sleeve 42, the coupling sleeve 42 may have the key 242 and the connector 220 has a mating keyway 106.

The connector 220 may have alignment pins (not shown) which mate with alignment openings (not shown) in the coupling sleeve 42. If such alignment pins are provided, the alignment pins do not contact the light blocking portion 26 of the shutter 20 during insertion or disengagement.

While a particular embodiment is illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

The invention claimed is:

1. A fiber optic adapter configured to mate with a fiber optic connector, the fiber optic connector having a connector body and a fiber containing ferrule protruding a distance from a forward end of the connector body; the adapter comprising:
   a housing forming a passageway;
   a coupling sleeve forming a passageway configured to accept the connector therein during an insertion of the connector in a longitudinal direction into the passageway;
   a shutter mounted to the coupling sleeve, the shutter comprising a base portion connected to the coupling sleeve and a light blocking portion extending from the base and extending into the passageway in a first position, the light blocking portion having at least a section being curved from a first end thereof to a second end thereof along a length of the section;
   wherein the coupling sleeve includes a recess into which the shutter is seated; and
   wherein the coupling sleeve includes a protrusion extending outwardly from the recess, and the shutter includes an opening into which the protrusion is seated.

2. The fiber optic adapter of claim 1, wherein during insertion of the connector into the passageway of the coupling sleeve, the connector body contacts the curved light blocking portion to unroll the curved light blocking portion into a second position, but the ferrule of the fiber optic connector does not touch the shutter.

3. The fiber optic adapter of claim 1, wherein the housing and the coupling sleeve include mating latching assemblies which are configured to releasably engage with each other.

4. The fiber optic adapter of claim 1, wherein the coupling sleeve comprises a flexible latch arm having a protrusion extending outwardly therefrom, the protrusion configured to engage a mating recess on the housing.

5. The fiber optic adapter of claim 1, wherein the coupling sleeve includes a key and the housing includes a keyway into which the key seats.

6. In combination, a fiber optic adapter and a fiber optic connector comprising:
   the fiber optic connector having a connector body and a fiber containing ferrule protruding a distance from a forward end of the connector body;
   the adapter comprising a housing forming a passageway, a coupling sleeve forming a passageway configured to accept the connector therein during an insertion of the connector in a longitudinal direction into the passageway, and a shutter mounted to the coupling sleeve, the shutter comprising a base portion connected to the coupling sleeve and a light blocking portion extending from the base and extending into the passageway in a first position, the light blocking portion having at least a section being curved from a first end thereof to a second end thereof along a length of the section;

wherein the coupling sleeve includes a recess into which the shutter is seated; and wherein the coupling sleeve includes a protrusion extending outwardly from the recess, and the shutter includes an opening into which the protrusion is seated.

7. The combination of claim 6, wherein during insertion of the connector into the passageway of the coupling sleeve, the connector body contacts the curved light blocking portion to unroll the curved light blocking portion into a second position, but the ferrule of the fiber optic connector does not touch the shutter.

8. The combination of claim 6, wherein the housing and the coupling sleeve include mating latching assemblies which are configured to releasably engage with each other.

9. The combination of claim 6, the mating latching assemblies comprises a flexible latch arm having a protrusion extending outwardly therefrom on one of the housing and the coupling sleeve, and a mating recess on the other of the housing and the coupling sleeve.

10. The combination of claim 6, wherein one of the housing and the coupling sleeve includes a key and the other of the housing and the coupling sleeve includes a keyway into which the key seats.

11. The combination of claim 6, wherein the connector includes a key and the coupling sleeve includes a keyway into which the key seats, the keyway being opposite to the protrusion.

12. The combination of claim 6, wherein the coupling sleeve and the connector include mating latching assemblies which are configured to releasably engage with each other.

13. The combination of claim 12, the mating latching assemblies comprises a flexible latch arm having a protrusion extending outwardly therefrom on one of the coupling sleeve and the connector, and a mating recess on the other of the coupling sleeve and the connector.

14. The combination of claim 6, wherein the connector includes a key and the coupling sleeve includes a keyway into which the key seats.

\* \* \* \* \*